Nov. 21, 1939.  A. NISSEN  2,180,544
ARM RAKE AND CARRIER
Filed Dec. 2, 1937
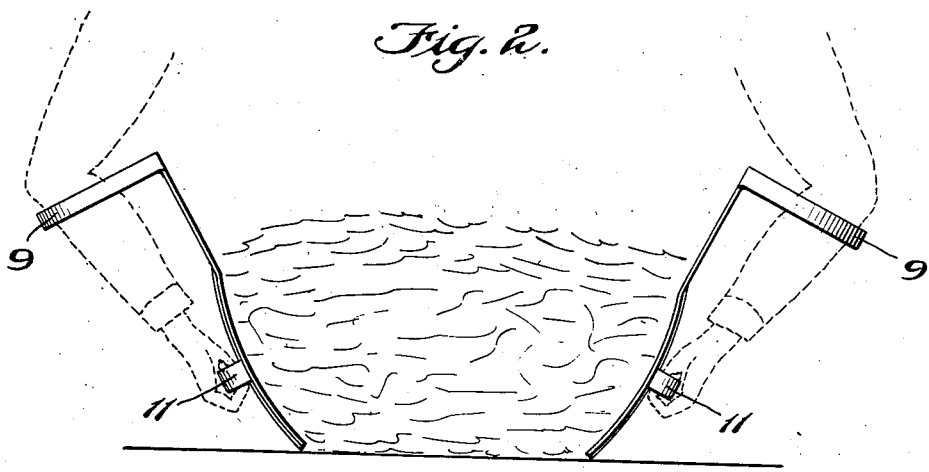
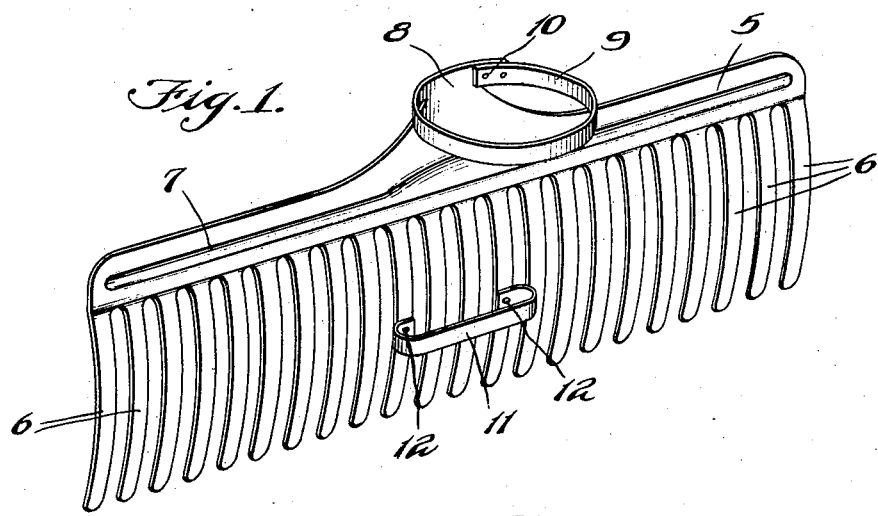
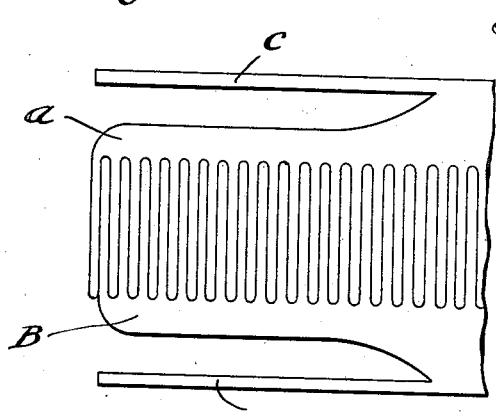
Inventor
Alfred Nissen
By Kent W. Wonnell
Atty.

Patented Nov. 21, 1939

2,180,544

UNITED STATES PATENT OFFICE 2,180,544

ARM RAKE AND CARRIER

Alfred Nissen, Lake Forest, Ill.

Application December 2, 1937, Serial No. 177,703

4 Claims. (Cl. 294—49)

This invention relates in general to a rake-like structure, each adapted to be supported by one arm and the hand of a user and to be used by both arms as a pickup and carrier.

An important object of the invention is in the provision of an arm rake, pickup and carrier adapted to be engaged by the forearm and fingers of one arm when used as a rake, and similar devices being used in pairs by both arms when used as a pickup or carrier for large bundles of loose materials such as leaves, stalks, twigs, and the like.

A further object of the invention is in the provision of an arm rake made of sheet material suitably strengthened and having an arm band or loop also formed of the material of the sheet.

A still further object of the invention is in the provision of arm rakes so designed that a pair can be cut from the same piece of sheet material, the teeth of one being the material from between the teeth of the other.

Other objects will appear hereinafter, the accompanying drawing illustrating a preferred embodiment of the invention in which:

Fig. 1 is a perspective of an arm rake constructed in accordance with the principles of this invention;

Fig. 2 illustrates a pair of arm rakes as applied to the opposite arms of a user for picking up and carrying a large quantity of loose material therebetween; and Fig. 3 is a fragmentary detail illustrating two arm rakes made from the same blank of material.

Gardeners, farmers, home workers, and the like, frequently desire a rake-like device which can be used for assemblying, picking up and carrying loose materials such as leaves, loose twigs, and the like, and for carrying them in a large bundle for storage or other disposal. An ordinary rake with a long handle is of no value for such use and a wider lawn broom or lawn rake also is provided with an attached handle which makes it of little value in picking up and carrying away loose materials.

Referring now more particularly to the drawing, an arm rake in accordance with this invention is formed, as shown more clearly in Fig. 1, of a single piece of sheet material, preferably sheet metal, having a head or header 5 from which a number of long and integral teeth 6 extend, preferably in a slight arc or curvature from header to add strength to the teeth, and the teeth also may be bent or slightly curved transversely to add strength against bending. The headers, each made of sheet material, is also commonly provided with a strengthening rib 7 formed up of the material from which it is made.

In making arm rakes of this kind, two rakes A and B are preferably stamped at the same time from a blank of material as illustrated in Fig. 3, the teeth of one being the material from between the teeth of the other, the opposite heads integrally joining their respective teeth and holding them together.

The head of each rake is formed with a central projection 8 at the side opposite the teeth and to this projection is secured an arm band 9 which may also be formed of the same material as the rake itself, the arm band forming a projection C which is stamped at each side of the blank as shown in Fig. 3. If formed integrally from the same sheet of material the free extremity or extremities of the arm band are attached together by fastening rivets 10 or other suitable fastening devices. This arm band projects rearwardly from the front face of the rake and a handle or finger hold 11 is also attached by rivets 12 or other suitable fastening devices to spaced teeth 6 adjacent the longitudinal center of the rake and preferably opposite the arm band 9 so that when the arm of a user as shown in Fig. 2, is inserted through an arm band, the handle 11 will be in convenient position to be grasped by the fingers of the same arm which is engaged by the band 9.

In using devices of this kind they may be grasped in any desired manner for collecting and assembling the loose material, and they are particularly desirable for use by gardeners and other workers in removing leaves and loose material from the roots and between bushes and the like. When a quantity or pile of loose material is gathered and it is to be carried away for other disposal, an arm rake is engaged by each of the hands and arms of a user, the two rakes thus assembled being used to engage a quantity of leaves or other loose material between them as shown in Fig. 2, so that the devices may be used for picking up, carrying and removing a large bundle or mass of the material, thereby transporting a larger mass of the material than could possibly be engaged by the bare arms and hands of the user.

Arm rakes of this kind are quickly and inexpensively made of sheet material, they are stamped and reinforced to make them light and strong, and are preferably sold in pairs so that while each one may be used separately, the common method of using them is to collect the material to be carried away with one of the rakes and then to pick up the material and carry it away using two of the rakes.

It is obvious that rakes of this kind may be used in a great variety of ways for collecting, picking up and carrying loose material of various kinds.

I claim:

1. An arm rake and pickup comprising a header having a plurality of teeth extending therefrom, an arm loop on the back of the header opposite the teeth, a finger grip attached to spaced teeth at the back thereof and adapted to be engaged by fingers of a user's arm inserted through the loop for use as a pickup.

2. An arm rake and carrier comprising a rake head and teeth made of sheet material, an arm loop at the back of the head also made of the same material, and a finger grip attached to the teeth at the rear side, each carrier being engaged and held by one arm and the fingers thereof in using it as a rake and carrier.

3. In an arm rake and carrier, a pair of similar devices made of the same piece of sheet material, each having a header and projecting teeth, the teeth of one being the material from between the teeth of the other, an arm loop extending from the header of each carrier, the arms of a user being inserted through the loops, and a rear grip for the fingers engaging the teeth, two devices on the arms being utilized for picking up material between the carriers and for holding and conveying a large quantity of material therebetween.

4. In an arm rake and carrier, a pair of similar devices each engaged by the forearm and fingers of one arm of a user, each device comprising a head with teeth extending therefrom, an arm loop attached to and extending from the back of the head through which the arm of a user may be loosely inserted, and a hand hold device attached to spaced teeth intermediate their ends and located opposite the arm band at the rear side of the rake so that with two arm rakes engaged by the opposite arms of a user, a quantity of loose material may be assembled and engaged between the arm rakes and such material may be picked up and carried thereby in a large quantity.

ALFRED NISSEN.